(12) United States Patent
Kalantzis

(10) Patent No.: US 6,913,453 B2
(45) Date of Patent: Jul. 5, 2005

(54) APPARATUS FOR PROTECTING THERMOCOUPLE CIRCUITS IN THERMOPLASTIC INJECTION MOULDING EQUIPMENT

(75) Inventor: Peter Kalantzis, Bolingbrook, IL (US)

(73) Assignee: Fast Heat Inc., Elmhurst, IL (US)

( * ) Notice: Subject to any disclaimer, the term of this patent is extended or adjusted under 35 U.S.C. 154(b) by 200 days.

(21) Appl. No.: 10/422,179

(22) Filed: Apr. 24, 2003

(65) Prior Publication Data
US 2004/0213867 A1 Oct. 28, 2004

(51) Int. Cl.[7] .............................................. B29C 45/72
(52) U.S. Cl. ...................... 425/144; 361/103; 361/104; 264/40.6; 264/328.14; 264/328.16; 425/548
(58) Field of Search ................. 425/143, 144, 425/547, 548, 549; 264/40.1, 40.6, 328.14, 328.16; 361/103, 104

(56) References Cited

U.S. PATENT DOCUMENTS 4,814,969 A * 3/1989 Kiyooka ...................... 700/81
5,320,513 A * 6/1994 Schmidt ...................... 425/143
5,795,511 A * 8/1998 Kalantzis et al. ........... 264/40.6
5,984,716 A * 11/1999 Starkey ....................... 425/144
6,000,831 A * 12/1999 Triplett ....................... 425/143
6,157,529 A * 12/2000 Ahuja ......................... 361/103
6,477,025 B1 * 11/2002 Goldbach et al. ........... 361/103

OTHER PUBLICATIONS

Tip 'N Ring™, Vishay Vitramon, "Multilayer Ceramic Chip Capacitors" Document No. 45015, Revision Oct. 5, 2000, pp. 45–47.
Radial–leaded, "PolySwitch Radial–leaded Resettable Devices", Raychem Circuit Protection, pp. 205–236.

* cited by examiner

Primary Examiner—Tim Heitbrink
(74) Attorney, Agent, or Firm—Leydig, Voit & Mayer, Ltd.

(57) ABSTRACT

An apparatus for protecting thermocouple circuits in an injection molding system includes a protection circuit for each thermocouple pair. The protection circuit includes a resettable fuse disposed in series with each thermocouple wire for preventing high leakage current from passing through, and a capacitor connected to the two wires of a thermocouple to filter out AC line noise. The protection circuits are integrated in a junction box used to connect a heater power cable and a thermocouple control cable to the hot-half of the molding machine.

18 Claims, 7 Drawing Sheets

APPARATUS FOR PROTECTING THERMOCOUPLE CIRCUITS IN THERMOPLASTIC INJECTION MOULDING EQUIPMENT

FIELD OF THE INVENTION

The present invention relates generally to thermoplastic injection molding technology, and more particularly to an apparatus for protecting the thermocouple circuits used in a thermoplastic injection molding machine for temperature sensing.

BACKGROUND OF THE INVENTION

A thermoplastic injection molding machine typically has a "cold-half" portion that contains appropriately shaped molds, and a matching "hot-half" portion that is connected to an injection system and contains a manifold or the like that provides flow passages for liquefied thermoplastic material to reach the molds in the cold-half. The hot-half of the molding machine contains multiple heaters for heating the injection molding material to maintain it in a liquid phase. To control the heating to maintaining the temperature of the molding material in an optimal range for the molding operation, the temperature in the hot half has to be closely monitored. To that end, thermocouples are typically used for detecting the temperature at different locations in the hot-half. The thermocouples are connected to an external thermocouple controller, which reads the voltage differential between the two wires in each thermocouple as an indication of the temperature at the junction end of the thermocouple wires disposed in the hot-half.

One problem frequently experienced by manufacturers that use injection molding systems is the damages to the thermocouple circuits caused by leakage current from heating elements. The heating elements in a molding machine are typically operated at a high current and relatively high voltage. If a heating element is not properly grounded, the current from that heating element may find its way to a nearby thermocouple wire and use the thermocouple wire as its return path. Such leakage current may destroy the thermocouple wire and damage the thermocouple controller.

SUMMARY OF THE INVENTION

In view of the foregoing, the general object of the present invention is to provide an apparatus for protecting thermocouple circuits in an injection molding machine from being damaged by leakage currents from heaters.

A related object is to provide a means for protecting the thermocouple circuits from leakage currents that is cost effective and can be easily integrated into the injection molding system.

A further object of the invention is to provide an apparatus for protecting the thermocouple circuits from leakage currents that also provides the function of filtering out AC line noise to enhance the accuracy of the thermocouple temperature readings.

DETAILED DESCRIPTION OF THE INVENTION

Figure 1:
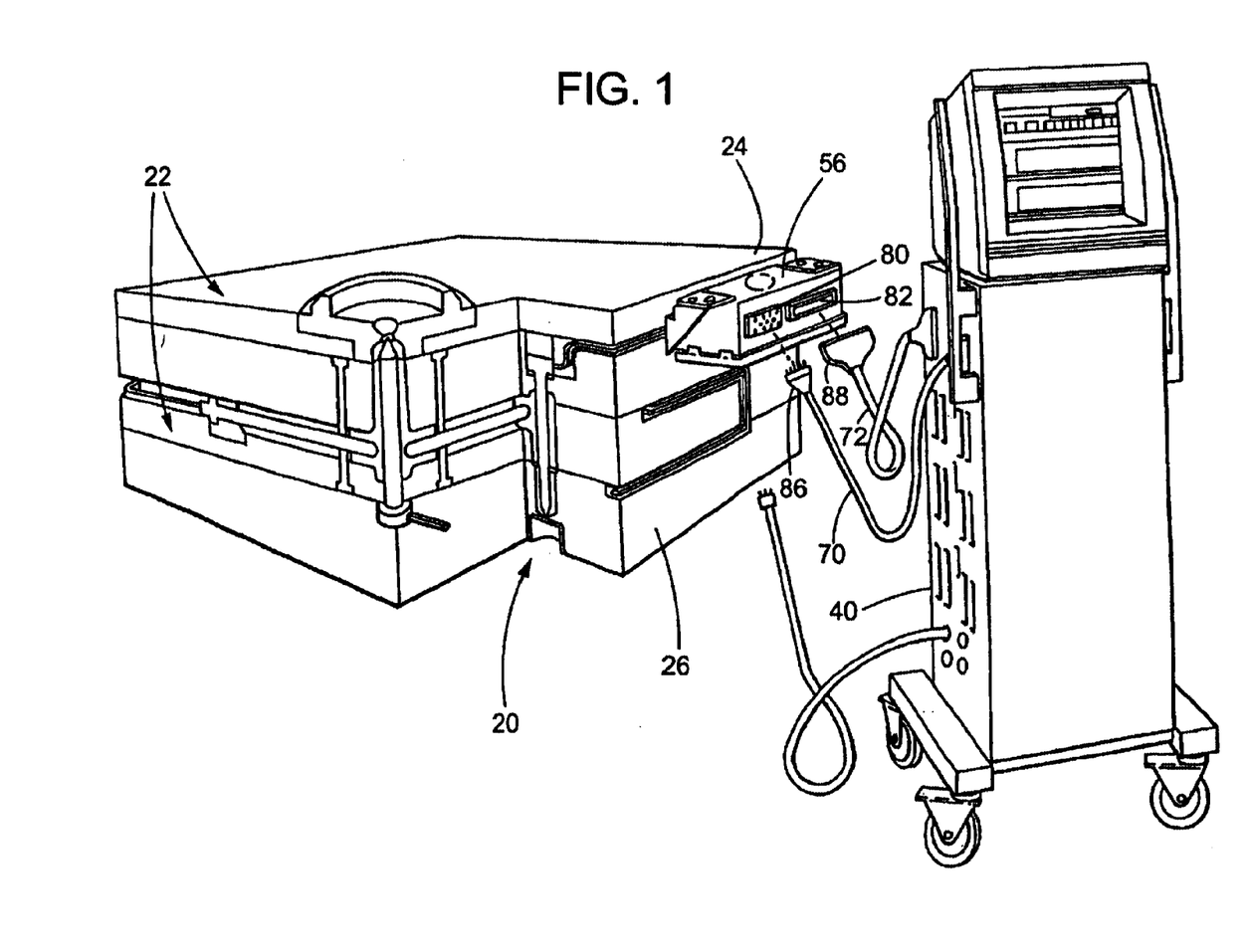
FIG. 1 is a perspective view of a thermoplastic injection molding system that includes a molding machine with a junction box that contains an embodiment of the thermocouple circuit protection apparatus of the invention.

Referring now to the drawings, wherein like reference numerals refer to like elements, FIG. 1 shows a molding system generally designated 20 into which the present invention has been incorporated. The system includes a molding apparatus 22 that comprises a hot-half 24 and a cold-half 26. As is conventional, the cold-half 26 includes one or more molds 28 (FIG. 2) that have been appropriately machined or otherwise formed in the shape of the object or objects to be molded.

Figure 2:
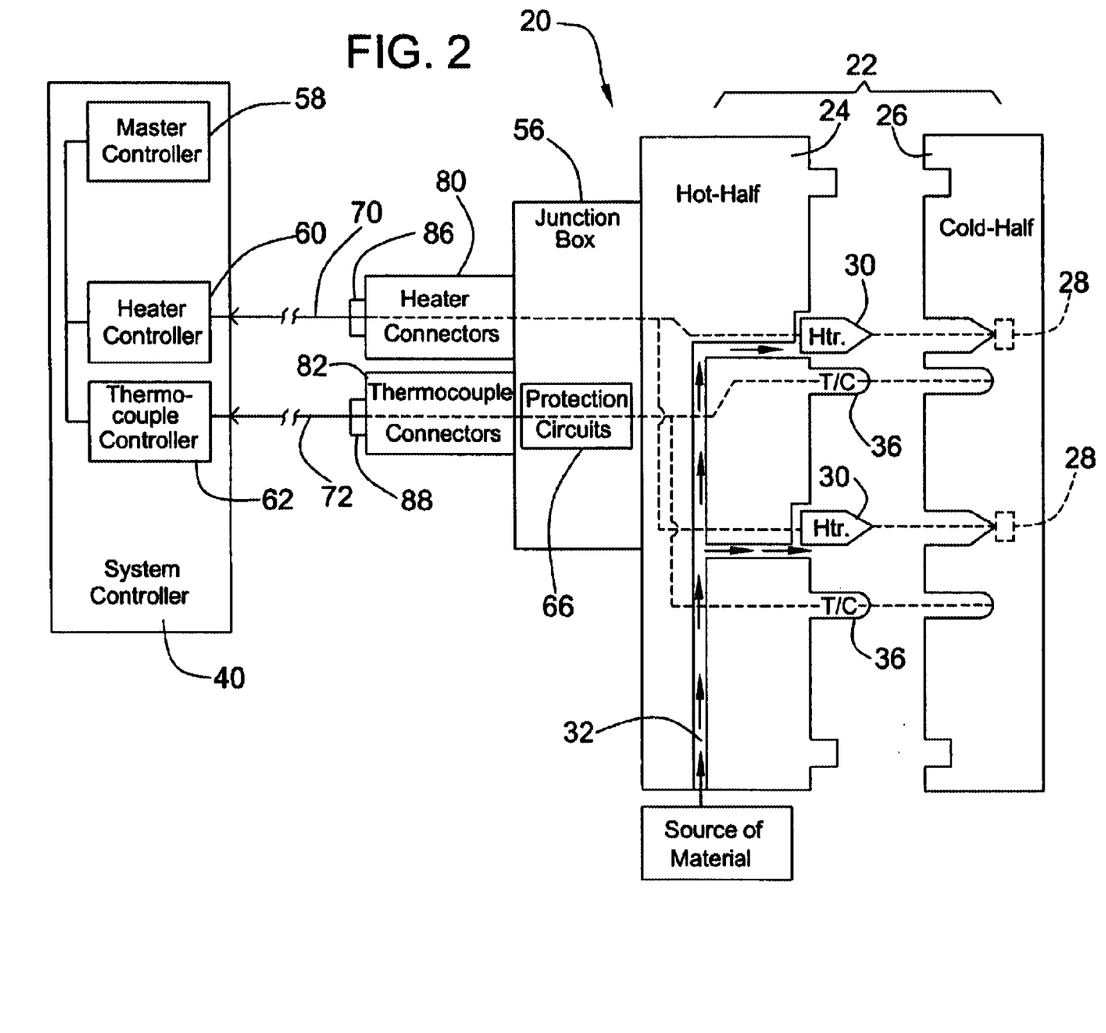
FIG. 2 is a functional block diagram of components of the injection molding system.

As best seen in FIG. 2, the hot-half 24 of the molding system includes one or more heating elements or heaters 30 suitably positioned to generate heat to maintain the liquefied injected molding material (e.g., thermoplastic) in a liquid form. To convey the liquefied material to the molds 28 in the cold-half 24, flow passages 32, which may include a manifold, is present within the hot-half 24.

For controlling the molding operation, a system controller 40 is provided. The system controller 40 includes a heater controller 60 for controlling the energization of the heaters 30. The heater controller 60 includes power electronics responsive to a master controller 58 for providing controlled power in the form of electrical currents to the heaters 30. To that end, the heaters 30 are connected by a heater cable 70 to the heater controller 60.

For monitoring the temperature of the liquefied molding material, thermocouples 36 are provided and advantageously positioned near corresponding heaters 30. The thermocouples 36 are connected via a cable 72 to a thermocouple controller 62 that is part of a system controller 40. The thermocouple controller 62 interfaces signals from the thermocouples 36 to the master controller 58.

As shown in FIGS. 1 and 2, to facilitate the connection and detachment of the cables 70, 72 that connect the system controller 40 to the hot-half 24, a junction box 56 is provided that has detachable connectors 80 and 82 for mating with respective connectors 86 and 88 at the respective ends of the cables 70 and 72. The junction box 56 is preferably mounted directly to the hot-half 24, as illustrated in FIG. 1. Preferably, the junction box 56 is attached to the side or top of a block of metal that forms the general structure of the hot-half 24.

As previously mentioned, the heaters 30 are typically energized with fairly high currents and voltages. It is common practice to use the body of the hot-half as the ground and the return path for the heating current, and the hot-half is in turn grounded via its mechanical connections to the injection molding machine. It is possible for the ground connection of a heater 30 to fail or otherwise become unconnected to the body of the hot-half. In that case, the thermocouple wires that are disposed close to the heater may become the current return path for the leakage current flowing from the heater. Since the thermocouple wires are typically fairly thin and with a low current-carrying capability, the leakage current can easily destroy the thermocouple wires. Moreover, the high magnitude of the leakage current and the associated high voltage may also damage the thermocouple controller 62.

In accordance of a feature of the invention, a protection circuit is provided for each thermocouple pair to block any excessive current from flowing through them, thereby protecting both the thermocouple wires and the thermocouple controller from being damaged by leakage current. The protection circuit further provides the function of filtering out 50/60 Hz line noise, thereby enabling the thermocouple controller 62 to more accurately and reliably determine the temperature of the hot-half 24 of the molding machine from the thermocouple signals.

Figure 3:
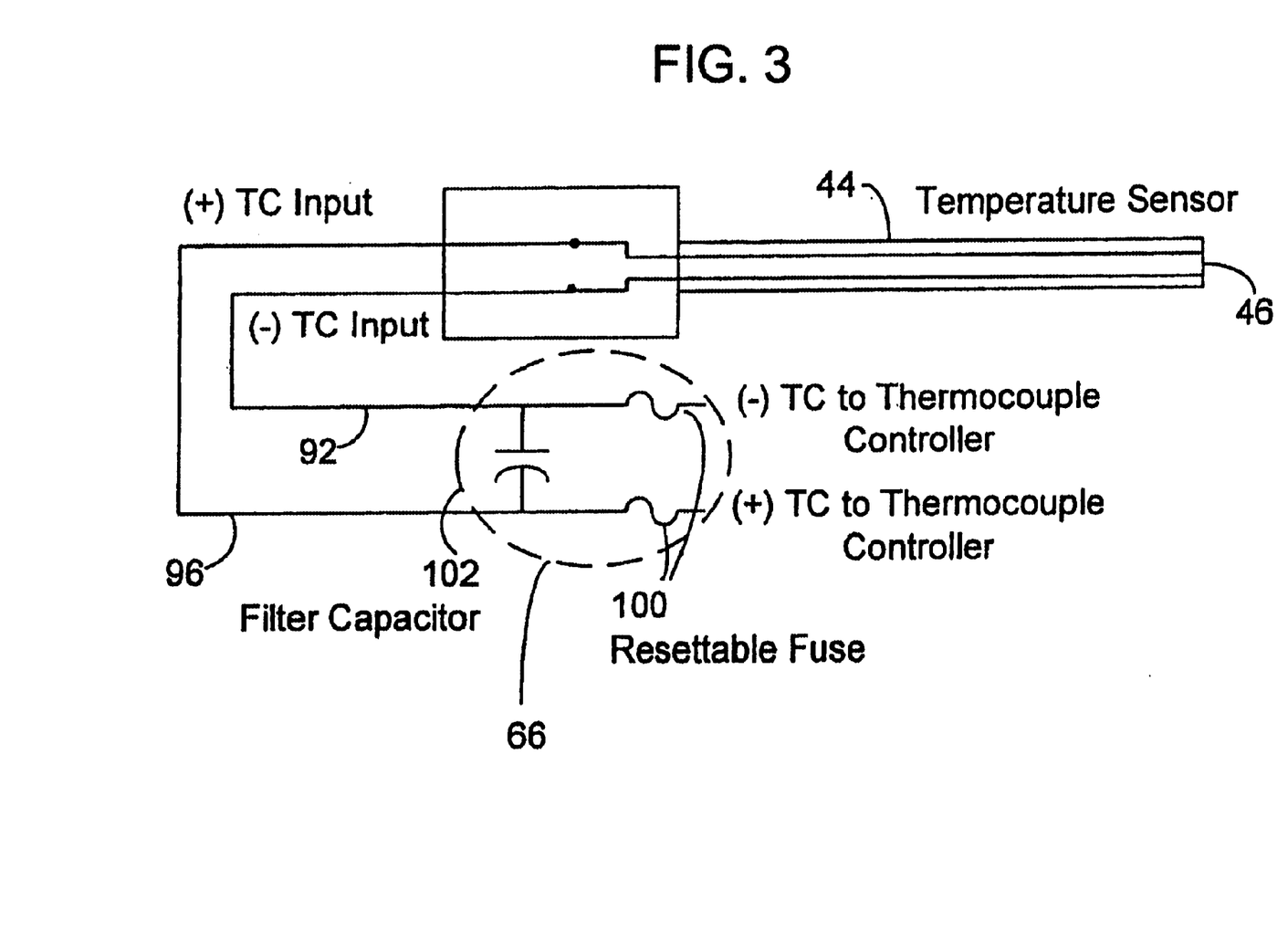
FIG. 3 is a schematic diagram showing a protection circuit for each thermocouple in the injection molding system in accordance with the invention.

As shown in FIG. 3, each thermocouple has a sensor head 44 that is to be disposed in the hot-half of the molding machine. The front tip of the sensor head 44 is the thermocouple junction where the two thermocouple wires 92 and 96 are in contact with each other. To prevent excessive current from damaging the thermocouple wires, a resettable fuse 100 is provided in series with each of the two wires 92 and 96 in a thermocouple pair. The resettable fuse 100, which is typically a "positive-temperature-coefficient" (PTC) device, allows the nominal amount of current generated during regular operation of the thermocouple to flow through, but shuts down when the current flowing through it becomes too high. In contrast to conventional fast-blow or slow-blow fuses, however, the resettable fuse has the important advantage that it can reset itself when the current drops to a normal level. A suitable type of resettable fuses is, for example, the PolySwitch radial leaded resettable devices of Raychem Circuit Protection. Such a device is tripped (i.e., becoming non-conductive) when the current increases beyond a certain threshold. The time it takes to trip the device ("time-to-trip") depends on the current and falls rapidly as the current goes higher.

To filter out the 50/60 Hz AC line noise, which may be picked up by the thermocouple wires from adjacent heaters or other sources through leakage current or by other means, the protection circuit 66 includes a capacitor 102 connected between the two thermocouple wires 92 and 96. The capacitor 102 coupled to the impedance of the thermocouple wires functions as a low-pass filter. The capacitance of the capacitor 102 is chosen to provide a filter corner frequency that is sufficiently low to effectively reduce the magnitude of the AC line noise reaching the thermocouple controller 62. A suitable type of capacitors for this application is, for example, the Vitramon multi-layer ceramic chip capacitors made by Vishay Intertechnology Inc.

Figure 4:
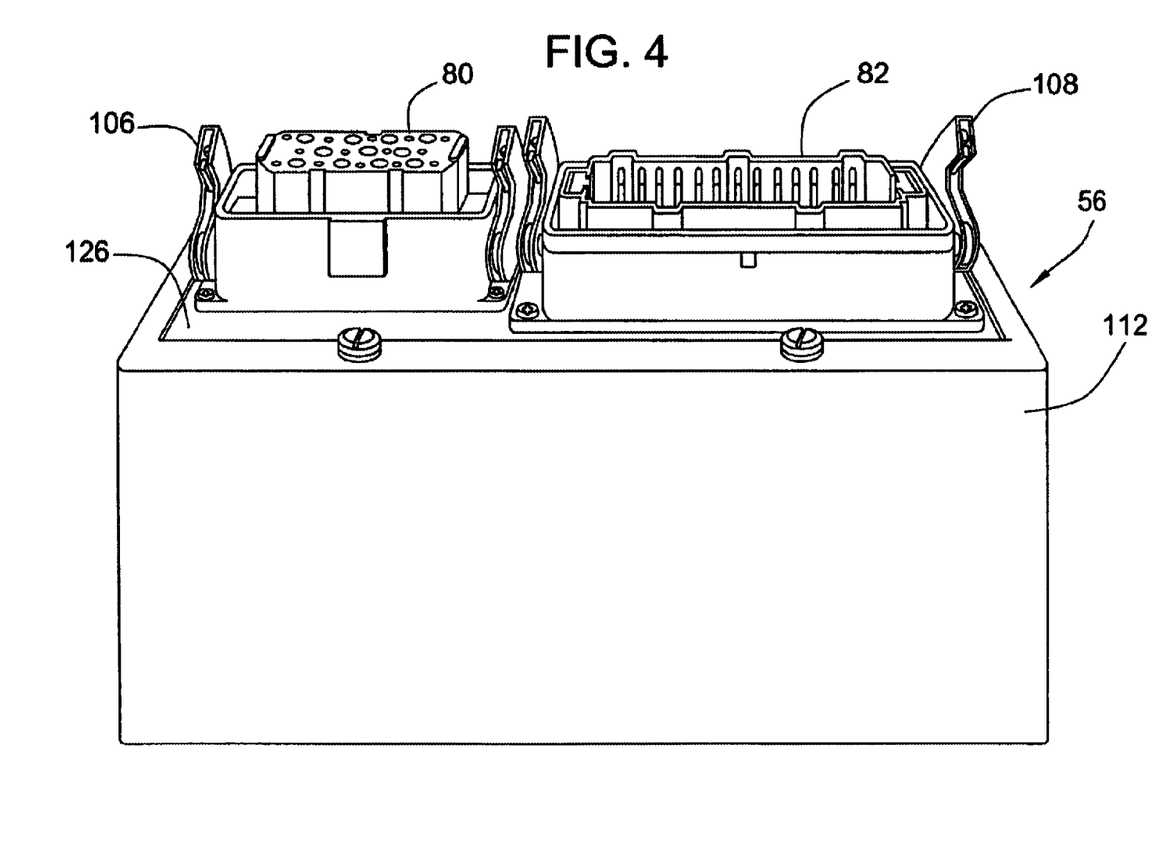
FIG. 4 is a perspective view of the junction box of a preferred embodiment.

In accordance with a feature of a preferred embodiment, the protection circuits 66 for the thermocouple circuits are integrated into the junction box 56 that connects the heater cable 70 and thermocouple cable 72 to the heaters 30 and thermocouple sensors 36 in the hot-half 24. As shown in FIG. 4, in one implementation, the junction box 56 has a multi-pin connector 80 for mating with the connector 88 on the thermocouple cable 72, and a second multi-pin connector 82 for mating with the connector 86 on the heater cable 70. To secure the connections between the cables and the junction box, the connectors 80 and 82 on the box have claps 106 and 108, respectively, that can be moved into locking positions to securely hold the cable connectors 88 and 86 once the connections are made. The junction box 56 has a removable housing 112 that can be removed by undoing two thumb-screws to allow easy access to the internal components of the junction box for making connections of heater power supply wires and thermocouple wires from the hot-half 24 to the connection terminals inside the junction box.

Figure 5:
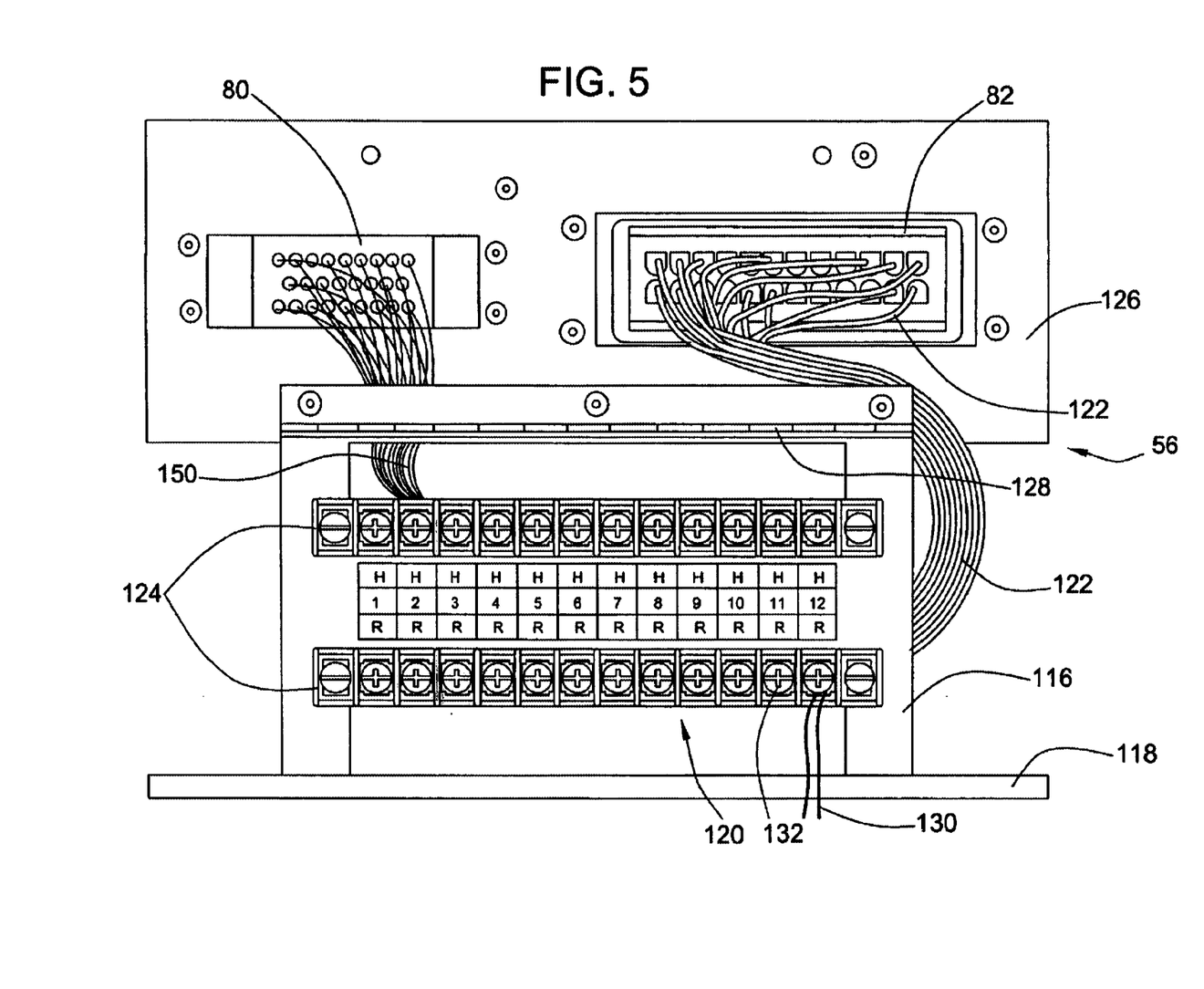
FIG. 5 is a front view of the junction box with its housing removed.

Turning to FIG. 5, the components inside the junction box 56 include a first bracket 116 secured to a base plate 118. A connection panel 120 for heater supply wires 122 is mounted on the bracket 116. The connection panel 120 includes two terminal strips 124 that have a plurality of screw-type connection terminals 132. Each of the connection terminals 132 is for accepting a heater supply wire 130 connected to a heater in the hot-half 24. For simplicity and clarity of illustration, only one such heater supply wire 130 is shown in FIG. 5. The backside of each connection terminal 132 is connected by a wire 122 to a corresponding pin in the heater supply connector 82. The top plate 126 of the junction box, on which the connectors 80 and 82 are mounted, is connected to the bracket 116 by a hinge 128 to allow the top plate to be flipped upward as shown in FIG. 5 to allow access to the underside of the connectors and the backside of the connection panel 120.

Figure 6:
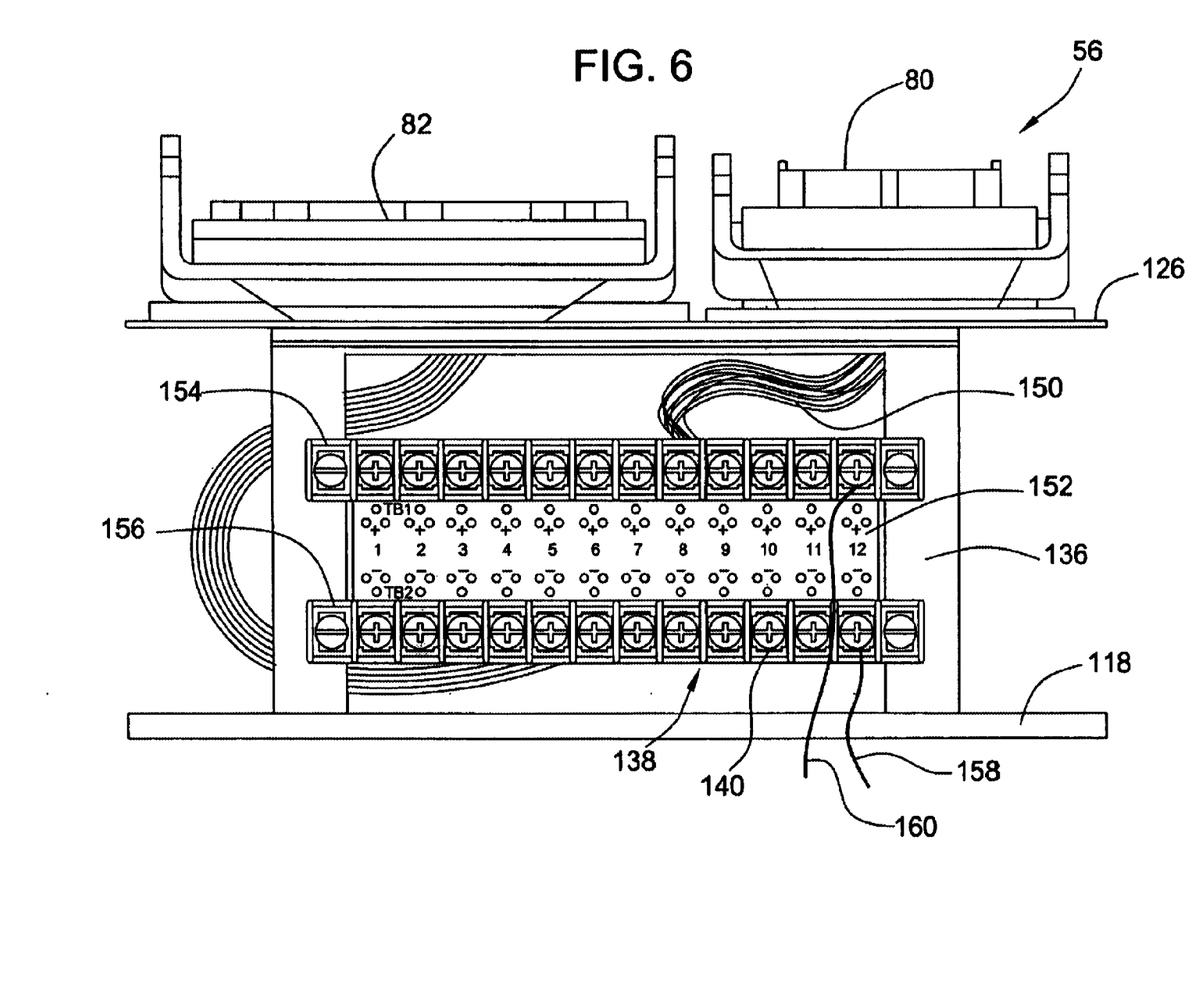
FIG. 6 is a rear view of the junction box with its housing removed.

FIG. 6 is a rear view of the junction box 56 with the housing 112 removed. This view shows a second bracket 136 on which a thermocouple wire connection panel 138 is mounted. The thermocouple connection panel 138 has two terminal strips 154 and 156 each having a plurality of screw-type terminals 140. Each connection terminal 140 on the terminal strip 154 is for receiving a wire 158 of a first type in a thermocouple pair connected to a sensor head in the hot-half, and a corresponding connection terminal on the lower terminal strip 156 is for receiving the other wire 158 of a second type in the thermocouple pair. For simplicity and clarity of illustration, only one pair of thermocouple wires 158, 160 is shown. Each connection terminal 140 is also connected by a wire 150 of the same type to a corresponding pin in the connector 80 mounted on the top plate 126.

Figure 7:
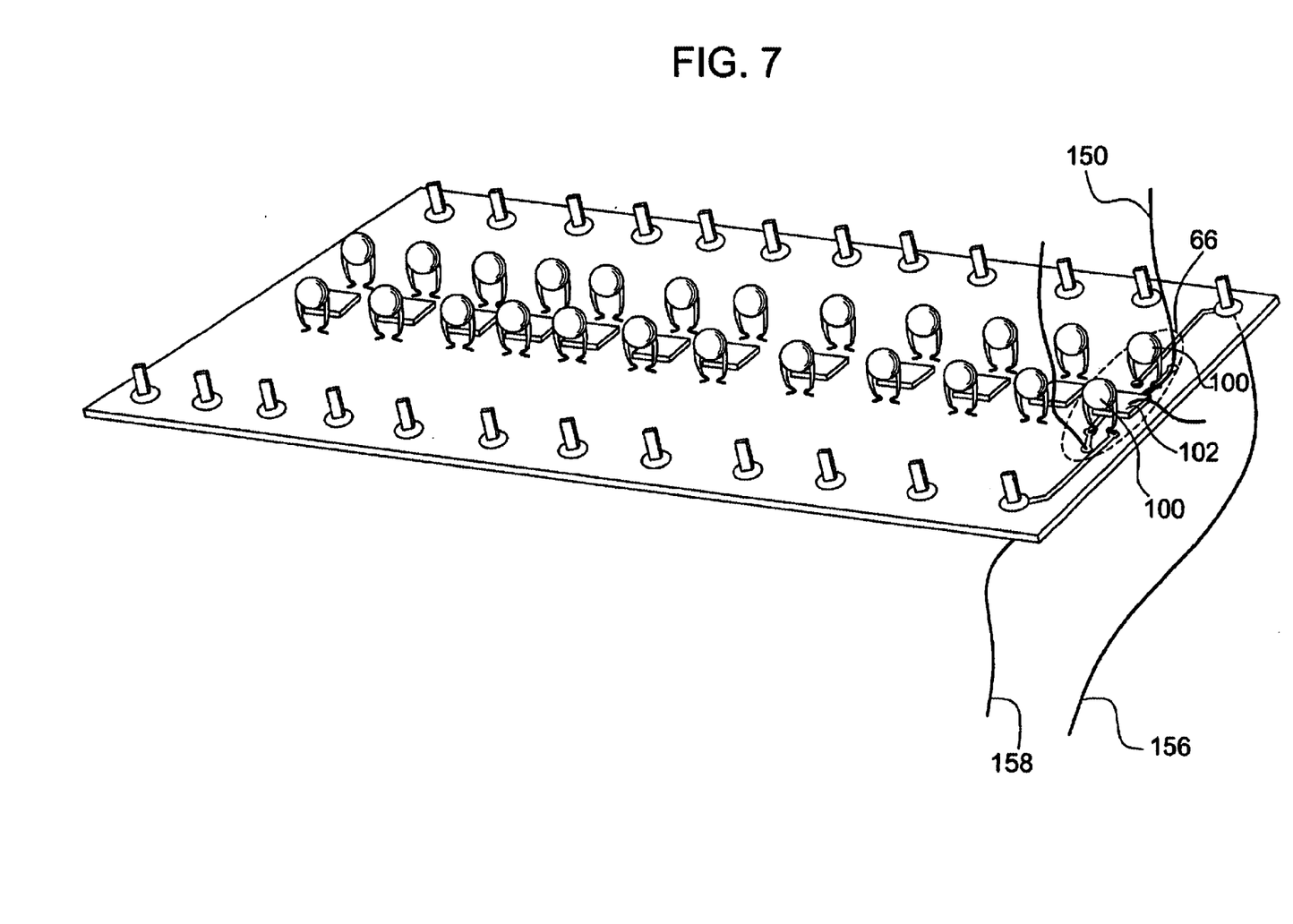
FIG. 7 is a perspective view of a circuit board mounted in the junction box that has protection/filtering circuits mounted thereon for protecting thermocouples used in the injection molding machine.

The connection panel 138 includes a printed circuit board 152 on which the protection circuits for the thermocouple pairs are mounted. In the view of FIG. 6, the circuit board 152 is mounted on the bracket 136 with the electronic components thereon facing inward. As best seen in FIG. 7, the protection circuit 66 on the circuit board 152 for each thermocouple pair includes two resettable fuses 100 (one for each thermocouple wire) for blocking leakage current, and a capacitor 102 for AC line noise filtering. Each resettable fuse 100 is connected to a thermocouple wire from the hot-half (e.g., the wire 156) and the corresponding wire 150 going to the connector 80, and the capacitor 102 is connected to both resettable fuses 100.

Even though in a preferred embodiment described above the thermocouple protection circuits are disposed in a junction box, it will be appreciated that the protection circuits may be located at other places without deviating from the scope and spirit of the invention. For instance, when connecting to a mold cable only, the protection circuits may be placed directly behind the thermocouple connector in the mold cable hood; when connecting to a mold thermocouple connector on a tool, the protection circuits can be placed directly behind the connector in the hot-half.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. An junction box for use with a molding system for connecting a heater power cable and a thermocouple cable to a hot-half of a molding machine, comprising:
   a heater supply connector for mating with a corresponding connector on the heater power cable;
   a thermocouple connector for mating with a corresponding connector on the thermocouple cable;
   a first group of connection terminals each for receiving a heater wire connected to a heater in the hot-half of the molding machine;
   a second group of connection terminals each for receiving a corresponding wire of a thermocouple disposed in the hot-half for temperature sensing;
   a plurality of protection circuits each for protecting one of said corresponding connected to a pair of connection terminals of the second group and including two resettable fuses each connected in series with a wire of the corresponding thermocouple for blocking excessive current and a low-pass filter connected between the two wires of the corresponding thermocouple for filtering AC line noise.

2. A junction box as in claim 1, wherein the resettable fuses are positive-temperature-coefficient devices.

3. A junction box as in claim 1, wherein each of the low-pass filters includes a capacitor.

4. A junction box as in claim 1, wherein the plurality of protection circuits are mounted on a printed circuit board.

5. A junction box as in claim 4, wherein the printed circuit board and the second group of connection terminals are mounted on a bracket inside the junction box.

6. A junction box as in claim 1, wherein the junction box has a removable housing.

7. An injection molding system comprising:
   a molding machine having a cold-half in which molds are formed and a hot-half having passageways for liquefied molding material to flow to the molds in the cold-half, the hot-half having a plurality of heaters for heating the molding material and a plurality of thermocouples disposed for sensing temperature at selected locations in the hot-half;
   a system control unit having a heater controller for providing heating power to the heaters in the hot-half and a thermocouple controller connected for receiving signals from the thermocouples for determining temperature readings of the thermocouples;
   a junction box for connecting the system control unit to the heaters and thermocouples in the hot-half, the junction box having a heater power connector for receiving a heater power cable connected to the heater controller and a thermocouple connector for receiving a thermocouple cable connected to the thermocouple controller, a first group of connection terminals each for receiving a heater wire of a heater in the hot-half, and a second group of connection terminals each for receiving a wire of a thermocouple in the hot-half each thermocouple having two wires,
   a plurality of protection circuits disposed in the junction box, each protection circuit protecting one of said thermocouples corresponding connected to a pair of connection terminals of the second group and including two resettable fuses each connected in series with a wire of the corresponding thermocouple for blocking excessive current and a low-pass filter connected between the two wires of the corresponding thermocouple for filtering AC line noise.

8. An injection molding system as in claim 7, wherein the resettable fuses in the protection circuits are positive-temperature-coefficient devices.

9. An injection molding system as in claim 7, wherein each of the low-pass filters in the protection circuits includes a capacitor.

10. An injection molding system as in claim 7, wherein the plurality of protection circuits are mounted on a printed circuit board.

11. An injection molding system as in claim 10, wherein the printed circuit board and the second group of connection terminals are mounted on a bracket inside the junction box.

12. An injection molding system as in claim 7, wherein the junction box has a removable housing.

13. A protection device for use in a molding system for protecting thermocouples used in a hot-half of a molding machine in the molding system, comprising:
   a thermocouple connector having a plurality of pins for mating with a corresponding connector on a thermocouple cable leading to a control unit of the molding system; and
   a plurality of protection circuits each for protecting a corresponding thermocouple used in the hot-half of the molding machine each thermocouple having two wires, each protection circuit having two resettable fuses each connected in series with a wire of the corresponding thermocouple and a corresponding pin of the thermocouple connector for blocking excessive current, and a low-pass filter connected between the two wires of the corresponding thermocouple for filtering AC line noise.

14. A protection device as in claim 13, wherein the resettable fuses are positive-temperature-coefficient devices.

15. A protection device as in claim 13, wherein each of the low-pass filters includes a capacitor.

16. A protection device as in claim 13, wherein the plurality of protection circuits are mounted on a printed circuit board.

17. A protection device as in claim 16, further including a housing, and wherein the printed circuit board is mounted inside the housing.

18. A protection device as in claim 13, further including a plurality of connection terminals each for receiving a wire of a thermocouple used in the hot-half of the molding machine.

* * * * *